Figure 1:
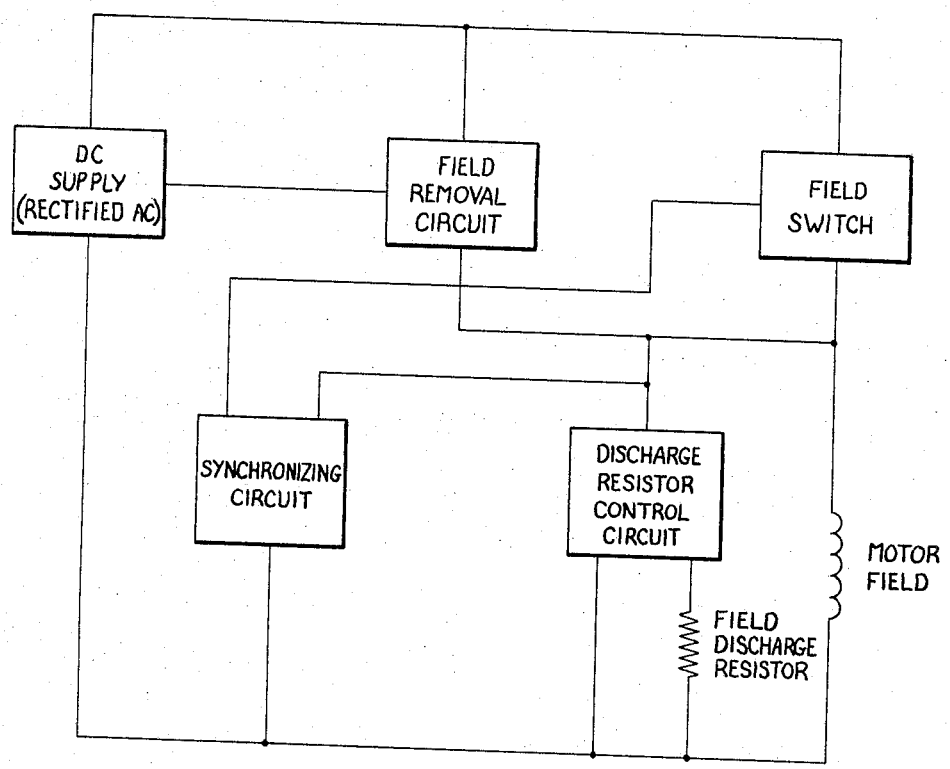

Oct. 31, 1967     J. J. BROCKMAN ETAL     3,350,613
CONTROL SYSTEM FOR A SYNCHRONOUS MOTOR
Filed June 17, 1963     2 Sheets-Sheet 1

INVENTORS
JOHN J. BROCKMAN
BARNARD L. GOSS
BY *James R. Campbell*
THEIR ATTORNEY United States Patent Office 3,350,613
Patented Oct. 31, 1967

3,350,613
CONTROL SYSTEM FOR A SYNCHRONOUS MOTOR
John J. Brockman, Schenectady, and Barnard L. Goss, Scotia, N.Y., assignors to General Electric Company, a corporation of New York
Filed June 17, 1963, Ser. No. 288,426
9 Claims. (Cl. 318—176)

The invention described herein relates to dynamoelectric machines and particularly to a system for controlling the starting, synchronizing and field removal functions of a brushless synchronous motor during various stages in its operation.

The use of rotor mounted silicon rectifiers for changing exciter alternating current to direct current useful as field excitation for synchronous machines, constituted an important advance in the motor and generator control system art, and applicants' assignees experience with machines of this type proves them highly successful. The major advantages gained lies in the elimination of brushes, slip rings and commutators and the maintenance usually associated with these current transfer components. Also, the necessity to house the arc producing components in a separate gas-proof enclosure when operated in a hazardous atmosphere, was eliminated.

This relatively new design of brushless synchronous machine however presented problems associated with absorbing the power generated in the field winding of large motors during starting, obtaining synchronization at the optimum slip and phase angle and in removing the field when synchronism was lost due to reduction in rotor speed.

During starting and certain other conditions of operation, induced voltages of varying magnitude are generated in the motor field winding. When these induced currents and usual DC field currents flow in the forward direction, two of the six exciter rectifiers used with a three-phase exciter must conduct the current, thus requiring that they be chosen of a size sufficient to accommodate total current flow. When the induced currents flow in the reverse direction and are larger than the excitation current, the rectifiers block current flow and the field then is effectively open circuited. Under this condition, the induced voltage may exceed the peak reverse voltage rating of the rectifiers with the likelihood of destroying their rectifying properties. To accommodate this, linear or nonlinear resistors are selectively connected across the field winding to provide a path for the induced field current, and appropriate equipment is used for this purpose. However, the disadvantages of this arrangement is that linear resistors waste substantial amounts of power thereby requiring a larger exciter and higher rectifier current capacity. The non-linear resistors reduce the exciter power losses but often are too bulky to mount on the rotor shaft.

Although conventional excitation systems readily provide a source and regulation of excitation power, they do not act with the degree of speed and precision believed needed for efficient motor performance. Precise control over insertion of the discharge resistor in the field circuit, switching on the field when synchronizing during motor starting, and switching off when loss of synchronization occurs, is not now carried out with the rapidity believed necessary. The reason for this is present control equipment used for these purposes primarily is of a mechanical operating type and is not sufficiently sensitive to detect either when these adverse conditions exist or to initiate energization of circuits to overcome such conditions.

The primary object of our invention therefore is to provide an improved excitation system for a brushless synchronous motor wherein the excitation voltage is withheld from the motor field until the desired motor speed is reached.

Another object of our invention is the provision of a switching circuit for connecting a resistor across the field winding whenever the induced field voltage rises to a predetermined value above normal voltage.

Still another object of our invention is the provision of a circuit effective in controlling application of excitation to the motor field at the proper slip and phase angle.

Another object of our invention is to effect removal of exciting power from the field winding when the motor starts losing synchronism.

In carrying out our invention, we employ fast acting solid state electronic components for controlling insertion of a discharge resistor in circuit with the motor field winding, in obtaining synchronization, and removal of the field under those conditions where the motor starts to lose its synchronism. The circuitry is designed to withhold application of excitation voltage to the field winding until the induced voltage frequency decreases to a predetermined value, at which time, the exciter voltage is applied to the field at the optimum slip frequency and phase angle. Almost simultaneously, the discharge resistor is removed from the circuit. If during operation, the motor gets out of step, a circuit senses decrease in the exciter frequency and acts to shut off excitation power to the field winding. The components then detect and measure the motor field induced voltage and repeatedly make attempt to resynchronize during each voltage cycle.

Figure 3:
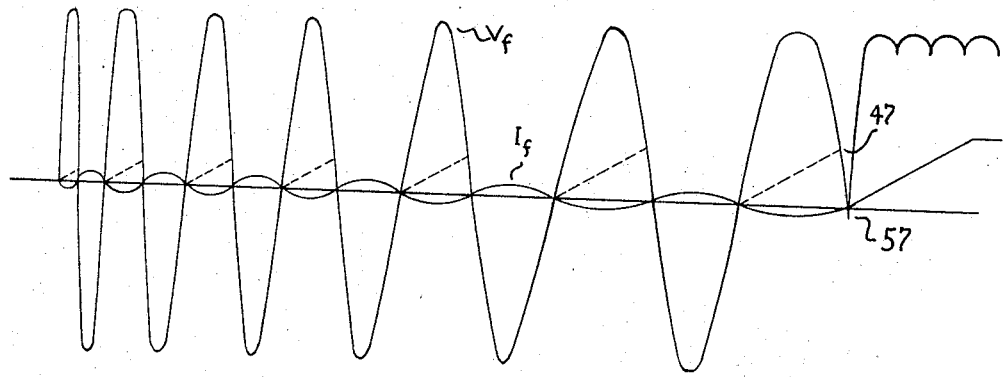
Figure 2:
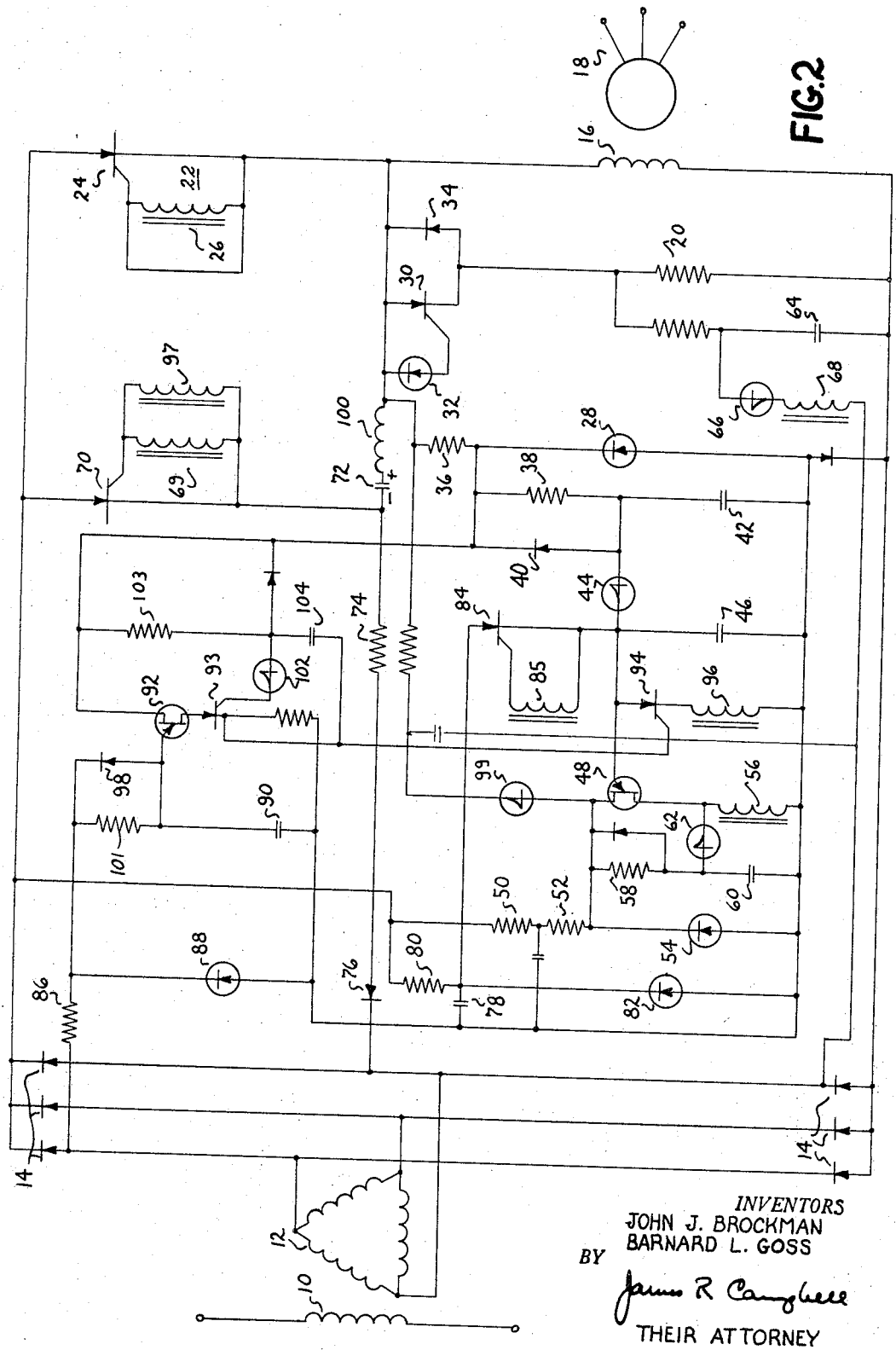

While the specification concludes with claims particularly pointing out and distinctly claiming the subject matter which we regard as our invention, it is believed the invention will be better understood from the following description taken in connection with the accompanying drawings in which:

FIGURE 1 is a diagrammatic showing in block form components for controlling a brushless synchronous motor;

FIGURE 2 schematically illustrates detailed circuitry for each of the components of FIGURE 1 and which are needed in controlling the operation of a synchronous machine; and FIGURE 3 is a curve showing induced voltage during starting and illustrating how the exciter field is applied at the optimum time and phase angle.

Referring now to the drawings wherein like reference characters designate like or corresponding parts throughout the several views, there is shown in FIGURE 1, a block diagram for a control system utilized in controlling a brushless synchronous motor. The circuit generally comprises a source of direct current obtained by rectifying the output from an alternating current exciter. This DC power is applied selectively to a synchronous motor field through the controlled rectifier field switch shown.

In a practical embodiment, the exciter armature and motor field windings are mounted on the same shaft in addition to all the components in the control circuit shown in FIGURES 1 and 2. The field switch is effective in withholding application of DC excitation to the motor field until just prior to the time when synchronization would occur and the proper point in time is reached in one cycle of induced voltage appearing at the motor field output terminals.

To avoid excessive voltages in the motor field winding and to increase starting torque, a field discharge resistor is connected across the motor field winding terminals and a discharge resistor control circuit is employed for selectively inserting the resistance in the circuit depending on the magnitude of the voltage induced in the field winding.

Referring further to FIGURE 1, in order to apply the DC excitation to the motor field at the proper slip and phase angle, a synchronizing circuit is employed which serves to carry out this function.

Under those conditions of operation, such as an extreme overload or loss of primary system power, requiring removal of DC excitation from the field, a field removal circuit is utilized for sensing when the motor is out of step or synchronism and is designed to initiate the action necessary to shut off excitation power to the field winding.

The physical arrangement of the exciter and synchronous motor is the same as in previous brushless synchronous motor designs with the rotating magnetic cores of the exciter and motor being mounted on the same shaft, and preferably, within the same housing or enclosure (not shown). In addition, all the control components shown in FIGURES 1 and 2 likewise are mounted on the same shaft. The control system disclosed herein is designed to satisfy the starting, synchronizing and field removal needs of a synchronous motor and ideally performs the following functions:

(1) Connects a discharge resistor across the motor field during acceleration to avoid high induced field voltages and to increase the starting torque.

(2) Applies D-C excitation to the motor field at the optimum slip and rotor angle.

(3) Opens the discharge resistor circuit to avoid continuous loss of exciter power.

(4) Protects the motor field against surges caused by line faults during normal operation.

(5) Removes field excitation and reconnects the field discharge resistor if the motor pulls out of synchronism.

(6) Resynchronizes if conditions to permit the motor to accelerate to synchronizing speed.

Referring now to FIGURE 2, the exciter field winding 10 is energized with a DC voltage and during starting and subsequent operation, the secondary 12 produces a three-phase alternating current voltage at its terminals. This voltage is rectified by rectifiers 14 and is made available for application to the synchronous motor field winding 16. Power is supplied to the motor armature winding, not shown, through contactors 18 to provide a rotating field on the stator. The joint action of the stator rotating field and rotor conductors during the time the rotor is accelerating, induces a voltage in the rotor field winding 16 which may reach magnitudes sufficient to cause damage to the insulation, if not controlled. As in the usual case, protection is afforded the insulation by connecting a resistor 20 across the field winding terminals for absorbing the power generated, thus limiting the field voltage to a safe value.

Exciter power to the field winding 16 is controlled by a field switch 22 comprising a silicon controlled rectifier 24 and pulse transformer 26. During rotor acceleration, the controlled rectifier 24 withholds the rectified exciter voltage from the field winding 16 until the time when synchronism should take place. As more fully described hereafter, when certain conditions in the circuit are met which satisfy the requirements for synchronism, the transformer 26 is pulsed and furnishes sufficient gate current to the controlled rectifier 24 to place it in a conducting state and thereby permit exciter current flow through it to field winding 16.

In order to protect the field winding insulation when the contactors 18 are closed and the shaft rotated, a silicon controlled rectifier 30, zener diode 32 and a diode 34 are connected in the field resistor circuit. The terminals of winding 16 are alternately of positive and negative polarity. Therefore, the path for induced current flow when the lower terminal is positive is through the resistor 20, diode 34 and the field winding 16. However, when the upper terminal becomes positive and the induced field voltage for any reason reaches a predetermined high magnitude, established by the rating of zener diode 32, the controlled rectifier 30 is made conducting by application of the induced field voltage to its gate through zener diode 32. This action connects the discharge resistor 20 in circuit with the field winding 16 for absorbing the power generated therein during the acceleration period. Because of the rapidity with which the controlled rectifier is made conducting, accurate control over the permissible voltage rise can be maintained, thus assuring safeguarding the insulation while obtaining the additional benefit of increase in the starting torque.

It is well known that maximum synchronizing torque is obtained by applying DC excitation to the motor field at the optimum slip and rotor angle. Because the chosen circuit components are fast acting, application of the DC excitation is accomplished with great precision. As a first step in determining the exact time when excitation should be applied to the field, the positive half cycles of induced field voltage during the starting period are clipped and regulated. The resistors 36, 38, and zener diode 28 perform this function by clipping the induced voltage $V_f$ as illustrated by the dotted lines on the curve of FIGURE 3. This curve shows that the magnitude of induced voltage stays about the same and the frequency decreases as the rotor approaches a synchronizing speed. The curve illustrates both the angle and time in the last slip cycle when the controlled rectifier is made conducting and the DC excitation applied to the field. Decrease in the frequency lengthens each cycle thus providing a longer time period within which to apply DC to the field and at an angle which is most acceptable relative to synchronization. The most advantageous time to apply the field occurs when the induced current goes through zero with positive slope to enable obtaining optimum pull-in torque.

The arrangement of components to accomplish this includes capacitor 42 which alternately is charged and discharged by each cycle of induced voltage. A four layer diode 44 connected to the capacitor is selected to become conducting when the voltage level on the capacitor reaches a certain value. During starting, when the induced frequency is high, the time available for charging capacitor 42 is insufficient to permit it to attain high energy voltage to fire the diode 44. In other words, the capacitor 42 does not reach the diode 44 switching voltage before the induced voltage reverses. This indicates that the slip frequency is too high to permit synchronization and the capacitor then discharges through the diode 40 during the negative half cycle. The capacitor therefore is used to determine when the slip frequency is at the correct value by attempting during each cycle to fire the diode 44. However, as the charging time increases because of reduction in slip frequency, the capacitor becomes charged to the diode 44 switching voltage and discharges through it to capacitor 46. The diode fires at the point indicated 47 in FIGURE 3. The time period thus remaining in which to initiate or trigger operation of the remaining components to obtain application of DC excitation to the field, is that between point 47 on the curve and where the induced voltage goes through zero.

Capacitor 46 is now prepared to discharge through unijunction transistor 48 to pulse transformer 56 which converts rectifier 24 to a conducting state to permit exciter current flow to the motor field winding. Unijunction transistor 48 does not conduct immediately however because its interbase voltage is maintained high enough to prevent conduction, even though capacitor 46 is now applying voltage to its emitter. The interbase voltage for unijunction transistor 48 is supplied by resistors 50 and 52 and zener diode 54. Transistor 48 is triggered into conduction by reducing its interbase voltage. This is accomplished at the desired rotor phase angle by action of four layer diode 99, which reaches its switching voltage when the field voltage becomes slightly negative. When diode 99 conducts, the bases of transistor 48 are momentarily connected across the motor field, causing the interbase voltage to dip. This permits transistor 48 to conduct the charge on capacitor 46 to the primary of pulse transformer 56. This pulse energizes the transformer secondary 26, thus turning on controlled rectifier 24 and permitting the exciter voltage to be applied to the motor field 16. With this arrangement, excitation is applied at both the preselected slip in the positive half cycle of field current $I_f$ and at the correct slip angle, which together represent optimum conditions for obtaining synchronization.

Under some starting conditions where the load is too light, the rotor may accelerate so rapidly that the optimum angle never occurs at the preselected slip, and the motor pulls into step on reluctance torque. To accommodate this situation and assure obtaining synchronism under light load conditions, a timing circuit is used including resistor 58 and capacitor 60. The capacitor is charged to 20 volts from the same exciter voltage supply which holds the voltage constant on the transistor 48, and a four-layer diode 62 is provided to conduct the capacitor 60 charge to pulse transformer 56 when the capacitor 60 is charged to a sufficiently high level. Energization of transformer 56 thus turns on controlled rectifier 24 to apply excitation to field winding 16.

When the above synchronizing conditions of optimum time and phase angle are reached for obtaining synchronization, and exciter voltage is applied to the motor field winding 16, controlled rectifier 30 is in a non-conducting state because the field voltage is slightly negative at that instant. During normal operation of the motor, resistor 20 may be turned on by the protesting action of zener diode 32 and silicon controlled rectifier 30, whenever line disturbances reflected in the motor field winding 16 cause excessively high field voltage transients. To turn off controlled rectifier 30, and thereby isolate field resistance 20 from the winding 16 circuit, controlled rectifier 24 is momentarily turned off by a circuit including capacitor 72, inductor 100 and controlled rectifier 70. Capacitor 64 is charged by the voltage across resistor 20. When the voltage on capacitor 64 reaches the switching voltage of four layer diode 66, the latter fires and conducts the capacitor charge to the primary of pulse transformer 68. The transformer secondary 69 provides sufficient gate current to turn on silicon controlled rectifier 70. Capacitor 72 initially is charged to the exciter voltage since its positive terminal is connected to the exciter positive lead and its negative terminal connected to an exciter phase through resistor 74 and diode 76. With controlled rectifier 70 now in a conducting state, the capacitor 72 will permit flow of the DC exciter field current through it to the winding 16. Since controlled rectifier 70 and capacitor 72 are connected in parallel with controlled rectifier 24, the latter will turn off because it is reverse biased by the polarity of capacitor 72. As capacitor 72 discharges, the exciter current would drop rapidly and inductance in the exciter would cause the exciter voltage to rise to an excessive value, possibly over voltaging field switch 22. To prevent this, controlled rectifier 70 provides the additional function of providing a path for exciter current through resistor 74 and diode 76.

As capacitor 72 charges with reversed polarity, the field voltage goes through zero and reverses. The voltage on controlled rectifier 30 is reversed, and it therefore is made non-conducting and will turn off. Controlled rectifier 70 will turn off when the exciter phase voltage reverses. Controlled rectifier 24 is then restored to conduction by the action previously described of charging capacitors 42 and 46 and having a pulse delivered through unijunction transistor 48 to transformer 56 which turns on controlled rectifier 24.

To insure that capacitor 46 will be charged to the level necessary to get transformer 56 to make controlled rectifier 24 conducting, an alternative source is used for charging capacitor 46 to the correct level. The circuit includes capacitor 78, resistor 80 and zener diode 82. The capacitor 78 is kept charged through resistance 80 to the zener diode 82 voltage level. Capacitor 78 is connected to controlled rectifier 84 and the secondary 85 of transformer 68 provides the controlled rectifier 84 with the necessary gate current to place it in a conducting condition. When the transformer primary 68 is pulsed by the discharge of capacitor 64, the secondary 85 turns on controlled rectifier 84 thus making available a unidirectional path for current flow from capacitor 78 to capacitor 46. If the latter is not charged to a sufficiently high level to fire transistor 48, capacitor 78 will discharge into it through rectifier 84 to raise the voltage level to the desired value. This circuit arrangement assures restoring controlled rectifier 24 to a conducting condition for reapplying excitation to the winding 16 even though sufficient voltage may not be available from resistor 20 to activate the circuits to turn on rectifier 24, and after rectifier 30 is restored to the blocking condition to isolate the field discharge resistor 20 from exciter voltage.

After the motor is started and discharge resistor 20 removed from the circuit, it may be necessary to remove the motor field current under certain conditions of operation. If the motor loses synchronism and slows down as a result of overload or other conditions, the DC excitation must be removed from the motor field winding 16. When speed reduction takes place and the slip frequency increases, if the magnitude of induced field current is less than the excitation current, or if the motor loses stator voltage so there is no induced field current, excitation will not be removed. However, when the motor induced field current is greater, provision is made for removal of the field and this is accomplished by restoring controlled rectifier 24 to a blocking condition. The resistor 86 and zener diode 88 clip the positive portions of the excitation voltage from 125 to 30 volts and capacitor 90 is charged from this regulated voltage through resistor 101 during each cycle. A unijunction transistor 92 and controlled rectifier 93 are connected in the capacitor discharge circuit so that when these are in a conducting state and provide gate current to controlled rectifier 94, capacitor 46 may be discharged through controlled rectifier 94 to energize pulse transformer 96.

If the charging time of capacitor 90 is too short, the transistor 92 will not fire thus indicating the exciter frequency is high and the motor therefore is not out of synchronism. Since the capacitor 90 is charged and recharged during each exciter cycle, its discharge path when the time is too short is through diode 98. When the capacitor 90 does charge to the 15 volts needed to fire the transistor 92, it means both the exciter frequency and speed are low and that the motor is out of synchronism. The transistor 92 therefore conducts the charge from capacitor 90 to the gate of controlled rectifier 94, turning it on and providing a path for transmission of the charge from capacitor 46 to the primary winding of transformer 96. When this occurs, two steps are accomplished: (a) controlled rectifier 70 is made conducting by the pulse through the secondary 97 of transformer 96 and controlled rectifier 24 is made nonconducting and blocking by the action of commutating capacitor 72 previously described, thus preventing the continued application of excitation voltage to the field in the manner also previously described, and (b) this circuit prevents rectifier 24 from turning back on and reapplying the field because capacitor 46 discharges through controlled rectifier 94 and transformer 96 rather than through transistor 48 and transformer 56. When controlled rectifier 70 fires, a path is provided for the DC excitation to flow through capacitor 72 to the field winding 16. When the exciter voltage goes through the negative half cycle, controlled rectifier 70 reverts to a non-conducting state.

The function of rectifier 93 is to prevent the field removal circuit from operating during the normal synchronizing process. When the motor is started, rectifier 93 is in the nonconducting condition, preventing the charge on capacitor 90 from initiating the field removal process, regardless of speed. However, after the motor has synchronized, the steady voltage appearing across zener diode 88 is applied to capacitor 104 through resistor 103. Some time is required to build up sufficient voltage on the capacitor to make four layer diode 102 and then rectifier 93 conducting. This time delay insures that the field removal scheme will not inadvertently operate during the critical synchronizing time. Rectifier 93 is held in the conducting condition by leakage current through transistor 92.

It will be noted that when excitation power is removed from the field winding by rectifier 24, field resistor 20 automatically is reinserted in series with the field winding for absorbing the power generated by the induced voltages. This circuit performance effectively isolates the exciter output from the motor field and the motor is allowed to operate as an induction motor until more favorable conditions arise to permit resynchronizing. The commutating action described is extremely fast, requiring less than one millisecond for its operation.

When the overload or other condition which caused the motor to slow down and get out of step has been overcome or dissipated, the motor then speeds up to make resynchronizing possible. Under these conditions, and providing the magnitude and frequency of the induced voltages in the field winding are appropriate for synchronizing, resynchronization is obtained by repeating the initial steps of charging capacitor 42 and discharging capacitor 46 through unijunction transistor 48 and transformer 56 to turn on controlled rectifier 24 and apply excitation to winding 16.

Although a specific circuit arrangement has been disclosed for illustrating the invention, it will be apparent to those skilled in the art that other modifications and variations are possible in light of the above teachings. Specific voltage values for the various components have been recited but it is evident these may be changed to accommodate the different parameters for different size machines. With the principles of operation thus established, it will be apparent that substitution of one type of component for another along with the addition or deletion of parts as necessary to obtain proper motor operation can be made without departing from the spirit and scope of the invention. For example other non-mechanical types of field switch components, such as solid state devices including transistors, five layer diodes, or the like can be substituted for the controlled rectifiers now used in the disclosed system, particularly rectifiers 24 and 30. Obvious and relatively simple changes in the circuitry to provide the transistor with a continuous voltage supply would readily occur to those skilled in the art. Likewise, the use of conventional devices such as inductors and diodes to make the five layer diodes conducting by raising the cathode to anode voltage, fall within the realm of this disclosure.

The principles herein are applicable equally to single phase operation in lieu of the polyphase use disclosed. Minor circuit changes would be necessary and it will be noted in the case of single phase machines, the field discharge resistor turn off circuitry would be unneccessary since the field voltage goes to zero twice each cycle of exciter frequency, thus providing many opportunities for the controlled rectifier 30 to turn off.

Although a shaft mounted exciter is disclosed, other power sources may be used such as motor-generator sets, static power rectifiers, transformers and the like. It therefore is to be understood that within the scope of the appended claims, the invention may be practiced other than as specifically described.

What we claim as new and desire to secure by Letters Patent of the United States is:

1. A control system for a synchronous motor comprising a rotor and stator having windings therein, a unidirectional power source for furnishing excitation to the field winding, a field switch interposed between the power source and the rotor field winding and selectively operable to establish a series loop circuit consisting essentially of said switch, said power source and said field winding, means in said switch withholding the application of excitation to the field winding until optimum conditions for synchronization take place in the motor, a resistive load and condition responsive means connected therewith and to the field winding for controlling insertion of the resistive load in parallel circuit with the field winding when the induced voltage therein reaches predetermined values, a synchronizing circuit connected with the field switch and the field winding for controlling application of the excitation to the field winding, said synchronizing circuit comprising detecting means for determining when the induced field current goes through zero during an acceptable cycle of slip frequency at which synchronization should take place, conducting devices connected with said detecting means and being associated with said field switch for transmitting an electrical pulse from said detecting means through said conducting devices to the field switch to convert the latter to a conducting state and thereby permit the application of excitation to the field winding, and a supplementary circuit associated with said conducting devices for energizing the latter and converting said field switch to a conducting state if the rotor synchronizes on reluctance torque without producing the stated acceptable conditions described above.

2. A control system for a synchronous motor having a rotor and a stator including windings therein, a source of unidirectional power for furnishing excitation to the field winding, a field switch interconnecting the excitation source with the field winding and completing a series loop circuit having said source and said field winding as the only other circuit elements therein, said switch comprising a semiconductor and an energizing device associated therewith for rendering the semiconductor conducting when the device is energized by control elements connected thereto, a discharge resistor in series circuit with a second switch connected in parallel with the field winding, said second switch including a semiconductor element capable of being converted to a conducting state by a second energizing device responsive to a predetermined magnitude of induced voltage in the field winding, said semiconductor element selectively connecting the discharge resistor to the field winding for absorbing the power generated therein during one-half cycle of induced voltage, and a diode connected with the resistor and field winding for forming a closed circuit during the other half of the induced voltage cycle, a synchronizing circuit connected with the field switch and including detecting means responsive to the frequency of induced voltage in the field winding for determining the slip frequency and angle at which excitation should be applied to the field winding, a switch in said circuit chosen to conduct at a predetermined voltage level for transmitting a signal from the detecting means to a pulsing element associated with said energizing device, said signal being effective in converting the field switch to a conducting state and thereby permitting application of the excitation voltage to the field winding, and means for removing the discharge resistor from the field winding after synchronism is reached.

3. The combination according to claim 2 wherein the control system further comprises field removal means connected to the field switch for converting the latter to a nonconducting state and thereby removing excitation from the field winding.

4. The combination according to claim 2 wherein a supplemental circuit including a charge storage device and a selectively conductive element associated therewith is connected between the power source and said field switch for energizing the latter and permitting application of excitation voltage to the field winding when the synchronizing circuit is not effective in energizing the field switch.

5. The combination according to claim 2 wherein said detecting means comprises a first capacitor alternately charged by the field winding induced voltage, and a second capacitor connected to the first capacitor through a switching element made conductive by a predetermined voltage on the first capacitor, said second capacitor being connected to the energizing device for applying excitation to the field winding.

6. The combination according to claim 5 wherein an alternative circuit including a second power storage device is connected with the undirectional power source and the synchronizing circuit, means connecting the power storage device with said second capacitor for assuring the energization of the energizing device in the field switch in the event the synchronizing circuit is not effective in operating the field switch to obtain application of the excitation voltage to the field winding.

7. A control system for a synchronous motor having a rotor and a stator and windings therein, an exciter connected through rectifiers to the field winding for providing DC excitation voltage thereto under conditions of synchronism, a field switch interconnecting said rectifiers and the field winding and including solid state conducting devices effective in withholding application of the excitation voltage to the field winding until the preselected slip frequency and slip angle is reached which is conductive to synchronism, a discharge resistor and a second switch included in a circuit with the field winding, said second switch including solid state devices responsive to the induced voltage in the field winding for selectively inserting the discharge resistor in the field winding circuit when said voltages reach a predetermined value, a synchronizing circuit connected with the field winding and the field switch and operable to convert the field switch solid state devices to a conducting status when the optimum conditions of slip frequency and slip angle is reached, said synchronizing circuit including detecting means for detecting the frequency of induced voltage in the field winding, conducting devices connected with said detecting means for transmitting a signal from the latter to a transformer when the slip frequency reaches a predetermined value, said transformer being electrically associated with the field switch for energizing the solid state devices therein thus permitting the application of excitation voltage to the field winding, and a field removal discharge circuit connected with the field switch, second switch and the field winding for removing the excitation voltage from the field winding when the motor loses synchronism, said field removal circuit comprising detector means for detecting when the frequency of the exciter field current is lower than a predetermined value, conducting means interconnecting the detector means with a pulsing device for transmitting a signal from the detector means to the device when the exciter frequency is less than a predetermined value, said pulsing device being associated with a conductive element connected to the field winding and in parallel with the field switch, and means interposed between the conductive element and field winding for providing a blocking effect in the field switch for cutting off flow of excitation current to the field winding, and means associated with said conductive element for converting it to a non-conducting state after the field switch is converted to a withholding position.

8. A control system for a synchronous motor having a rotor and a stator including windings therein, a source of unidirectional power for furnishing excitation to the field winding, a field switch comprising solid state devices, said field switch being energizable to close a series loop circuit having said field winding and said source of unidirectional power as the only other circuit elements therein, a resistive load including switch means responsive to the power generated by induction in the field winding and energizable for selectively connecting the resistive load in parallel circuit with the field winding, a synchronizing circuit including detecting means connected with the field winding for determining the slip frequency at which the excitation should be applied to the field winding, conductive elements connected with the detecting means and field switch for delivering a pulse of sufficient magnitude to the latter for converting it to a conducting state and permitting the application of excitation voltage to the field winding, means for removing the resistive load from the field winding when the excitation voltage is applied to the latter, and field removal circuit means connected with the field switch for converting the latter to a non-conducting state and thereby removing the excitation power from the field winding when synchronism is lost in the motor, said field removal circuit means comprising a first charge storage device connected to the resistive load and to an energizable element, a semiconductor device connected on one side to the unidirectional power source and at its other to a second charge storage device in circuit with the field winding, so that when the unidirectional power to the field winding is interrupted, said semiconductor device is converted to a conducting state by said first charge storage device and energizable element to provide a path for the power source current and thereby prevent damage to the power source components.

9. The combination according to claim 8 wherein an inductor is connected to said second charge storage device for minimizing a rapid rate of rise of the current flowing in the circuit.

References Cited
UNITED STATES PATENTS

| | | | |
|---|---|---|---|
| 2,425,047 | 8/1947 | Reeves | 318—176 |
| 3,100,279 | 8/1963 | Rohner | 318—167 |

ORIS L. RADER, *Primary Examiner.*

G. RUBINSON, *Assistant Examiner.*